(12) United States Patent
Lai

(10) Patent No.: US 8,899,249 B2
(45) Date of Patent: Dec. 2, 2014

(54) LIFTING DEVICE FOR UMBRELLA

(71) Applicant: Jin-Sheng Lai, Taipei (TW)

(72) Inventor: Jin-Sheng Lai, Taipei (TW)

(73) Assignee: Galtech Computer Corp., Newbury Park, CA (US)

( * ) Notice: Subject to any disclaimer, the term of this patent is extended or adjusted under 35 U.S.C. 154(b) by 0 days.

(21) Appl. No.: 13/790,008

(22) Filed: Mar. 8, 2013

(65) Prior Publication Data

US 2014/0252191 A1  Sep. 11, 2014

(51) Int. Cl.
*A45B 3/00* (2006.01)
*A45B 5/00* (2006.01)
*F16M 11/42* (2006.01)
*F16M 11/24* (2006.01)

(52) U.S. Cl.
CPC ............... *F16M 11/42* (2013.01); *F16M 11/24* (2013.01)
USPC ..... 135/16; 248/522; 248/188.4; 248/346.05; 248/346.11

(58) Field of Classification Search
CPC .......................... E04H 12/22; A45B 2023/0012
USPC ......... 248/519, 346.01, 129, 522, 525, 188.4, 248/346.05, 346.11; 135/16; 254/231, 232, 254/233, 234
See application file for complete search history.

(56) References Cited

U.S. PATENT DOCUMENTS

| | | | |
|---|---|---|---|
| 2,783,055 A * | 2/1957 | Michaud | 280/43.14 |
| 7,431,259 B2 * | 10/2008 | Tung | 248/521 |
| 7,641,165 B2 * | 1/2010 | Li | 248/519 |
| 8,555,904 B1 * | 10/2013 | Lai | 135/16 |
| 2002/0053631 A1 * | 5/2002 | Li | 248/521 |
| 2012/0024329 A1 * | 2/2012 | Ma | 135/16 |
| 2012/0024330 A1 * | 2/2012 | Ma | 135/16 |
| 2012/0025050 A1 * | 2/2012 | Ma | 248/346.01 |
| 2012/0205509 A1 * | 8/2012 | Marugg | 248/346.01 |
| 2012/0285499 A1 * | 11/2012 | Li | 135/16 |
| 2013/0134285 A1 * | 5/2013 | Weng | 248/523 |

\* cited by examiner

*Primary Examiner* — Terrell McKinnon
*Assistant Examiner* — Michael McDuffie
(74) *Attorney, Agent, or Firm* — Alan Kamrath; Kamrath IP Lawfirm, P.A.

(57) ABSTRACT

A lifting device for an umbrella includes a base, a plurality of fixing seats secured on the base, a plurality of movable members each movably mounted in the respective fixing seat, a pressing module movably mounted on the base and pressing the movable members, a threaded rod mounted on the base and connected with the pressing module, and a drive handle connected with the threaded rod. The pressing module includes a driven rod and two pressing rods. Each of the pressing rods is provided with a straight pressing portion that is movable to press the respective movable member and at least one recessed release portion that is movable to receive the respective movable member. Thus, each of the movable members is rotatable freely so that the lifting device is moved on the ground easily.

14 Claims, 6 Drawing Sheets

LIFTING DEVICE FOR UMBRELLA

BACKGROUND OF THE INVENTION

1. Field of the Invention

The present invention relates to a lifting device and, more particularly, to a lifting device for an umbrella.

2. Description of the Related Art

A conventional fixed umbrella of a larger size comprises a stand placed on the ground, a skeleton connected with and supported by the stand, and a shading member mounted on the skeleton. However, the conventional umbrella has a larger volume and a heavier weight so that the conventional umbrella cannot be moved easily, thereby causing inconvenience to the user when wishing to translate or displace the conventional umbrella.

BRIEF SUMMARY OF THE INVENTION

In accordance with the present invention, there is provided a lifting device for an umbrella, comprising a base, a plurality of fixing seats secured on the base, a plurality of movable members each movably mounted in a respective one of the fixing seats, a pressing module movably mounted on the base and pressing the movable members, a threaded rod mounted on the base and connected with the pressing module, and a drive handle connected with the threaded rod. Each of the fixing seats is provided with a receiving chamber and a guide slot. The pressing module includes a driven rod and two pressing rods connected with two opposite ends of the driven rod. The driven rod of the pressing module is provided with a through hole connected with the threaded rod. Each of the pressing rods of the pressing module is extended through and movable in the guide slot of each of the fixing seats. Each of the pressing rods of the pressing module is provided with a straight pressing portion and at least one recessed release portion. The pressing portion of each of the pressing rods is movable to press a respective one of the movable members. The release portion of each of the pressing rods is movable to align with and receive a respective one of the movable members. Each of the movable members is movable in the receiving chamber of the respective fixing seat.

The primary objective of the present invention is to provide a lifting device that is operated to lift and move an umbrella.

According to the primary advantage of the present invention, each of the movable members is rotatable freely through an angle of about 360° so that the lifting device is moved on the ground in multiple directions and multiple angles, thereby facilitating the user manipulating and moving the lifting device.

According to another advantage of the present invention, the user only needs to rotate the drive handle to lower down the movable members and to lift the lifting device so as to move the lifting device by movement of the movable members so that the lifting device is operated easily and conveniently, thereby facilitating the user operating the lifting device.

According to a further advantage of the present invention, the lifting device has a simplified construction to decrease the cost of fabrication.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
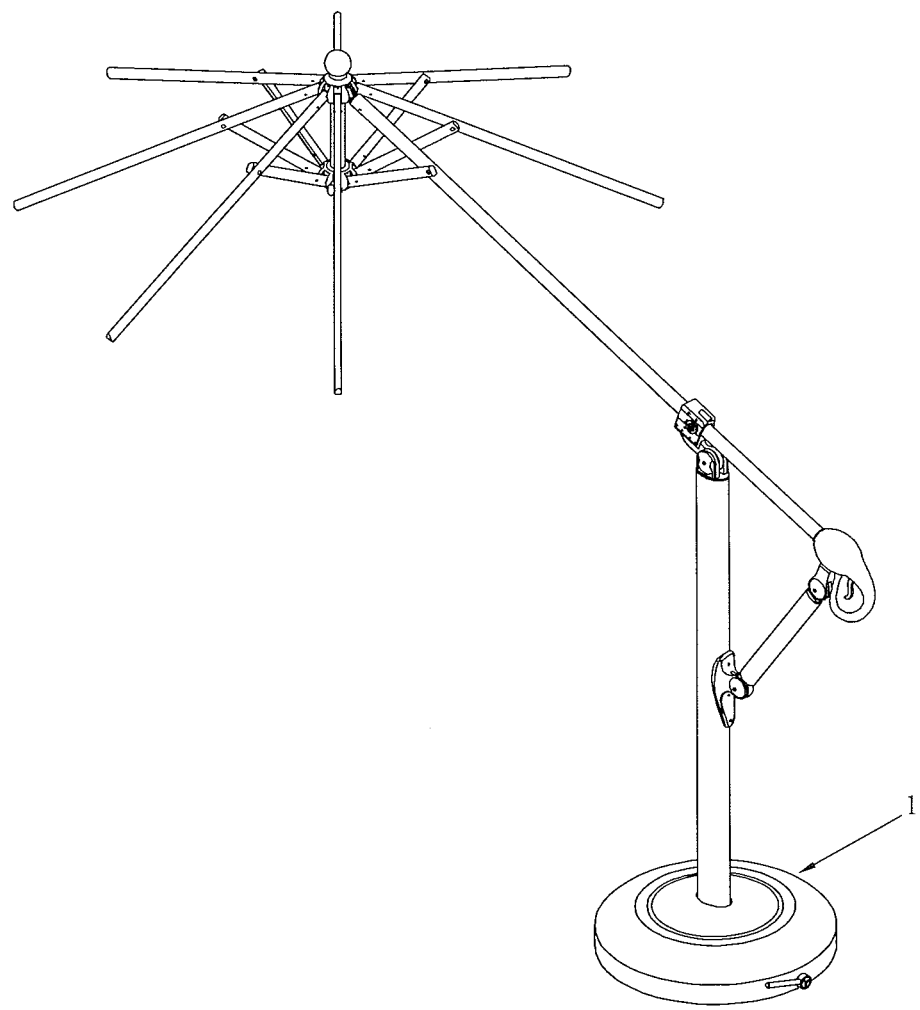
FIG. 1 is a perspective view of a lifting device for an umbrella in accordance with the preferred embodiment of the present invention.

Referring to the drawings and initially to FIGS. 1-4, a lifting device 1 for an umbrella in accordance with the preferred embodiment of the present invention comprises a base 11, a plurality of fixing seats 12 secured on the base 11, a plurality of movable members 13 each movably mounted in a respective one of the fixing seats 12, a pressing module 16 movably mounted on the base 11 and pressing the movable members 13, a threaded rod 111 mounted on the base 11 and connected with the pressing module 16, and a drive handle 112 connected with the threaded rod 111.

The base 11 is provided with a threaded tube 110 which is located at a side of the base 11. The base 11 is provided with a receiving space 113 to receive the pressing module 16.

Each of the fixing seats 12 is provided with a receiving chamber 122 and a guide slot 121. The receiving chamber 122 of each of the fixing seats 12 extends through a whole length of each of the fixing seats 12. The receiving chamber 122 of each of the fixing seats 12 has a stepped shape and is provided with a protruding stop portion 123. The guide slot 121 of each of the fixing seats 12 is connected to the receiving chamber 122.

The pressing module 16 is movable in the receiving space 113 of the base 11 and is located between the base 11 and the movable members 13. The pressing module 16 has a substantially U-shaped profile and includes a driven rod 14 and two pressing rods 15 connected with two opposite ends of the driven rod 14. The driven rod 14 of the pressing module 16 is provided with a through hole 141 connected with the threaded rod 111. The through hole 141 is located at a mediate portion of the driven rod 14. Each of the pressing rods 15 of the pressing module 16 is extended through and movable in the guide slot 121 of each of the fixing seats 12. Each of the pressing rods 15 of the pressing module 16 is provided with a straight pressing portion 152 and at least one recessed release portion 151. The pressing portion 152 of each of the pressing rods 15 is movable to press a respective one of the movable members 13. The release portion 151 of each of the pressing rods 15 is movable to align with and receive a respective one of the movable members 13. Thus, each of the pressing rods 15 of the pressing module 16 is movable between a first position as shown in FIG. 4 where the release portion 151 of each of the pressing rods 15 aligns with and receives the respective movable member 13 so that the respective movable member 13 is fully retracted into the receiving chamber 122 of the respective fixing seat 12, and a second position as shown in FIG. 6 where the pressing portion 152 of each of the pressing rods 15 presses the respective movable member 13 so that the respective movable member 13 is partially protruded outward from the receiving chamber 122 of the respective fixing seat 12.

Each of the movable members 13 is located between the respective fixing seat 12 and the respective pressing rod 15 of the pressing module 16. Each of the movable members 13 is movable in the receiving chamber 122 of the respective fixing seat 12 and is stopped by the stop portion 123 of the respective fixing seat 12. Preferably, each of the movable members 13 is a castor which is rotatable freely in the receiving chamber 122 of the respective fixing seat 12 through an angle of about three hundred and sixty degrees (360°).

The threaded rod 111 is screwed into the threaded tube 110 of the base 11. The threaded rod 111 is rotatably and movably mounted on the base 11 and has a first end abut the driven rod 14 of the pressing module 16 to move the driven rod 14 of the pressing module 16 and a second end connected with the drive handle 112. The first end of the threaded rod 111 is connected with and rotatable in the through hole 141 of the driven rod 14. Thus, when the threaded rod 111 is rotated in the threaded tube 110 of the base 11, the threaded rod 111 is movable forward and backward relative to the base 11 to move the driven rod 14 of the pressing module 16 so that the pressing rods 15 of the pressing module 16 are movable relative to the movable members 13 and the fixing seats 12.

Figure 2:
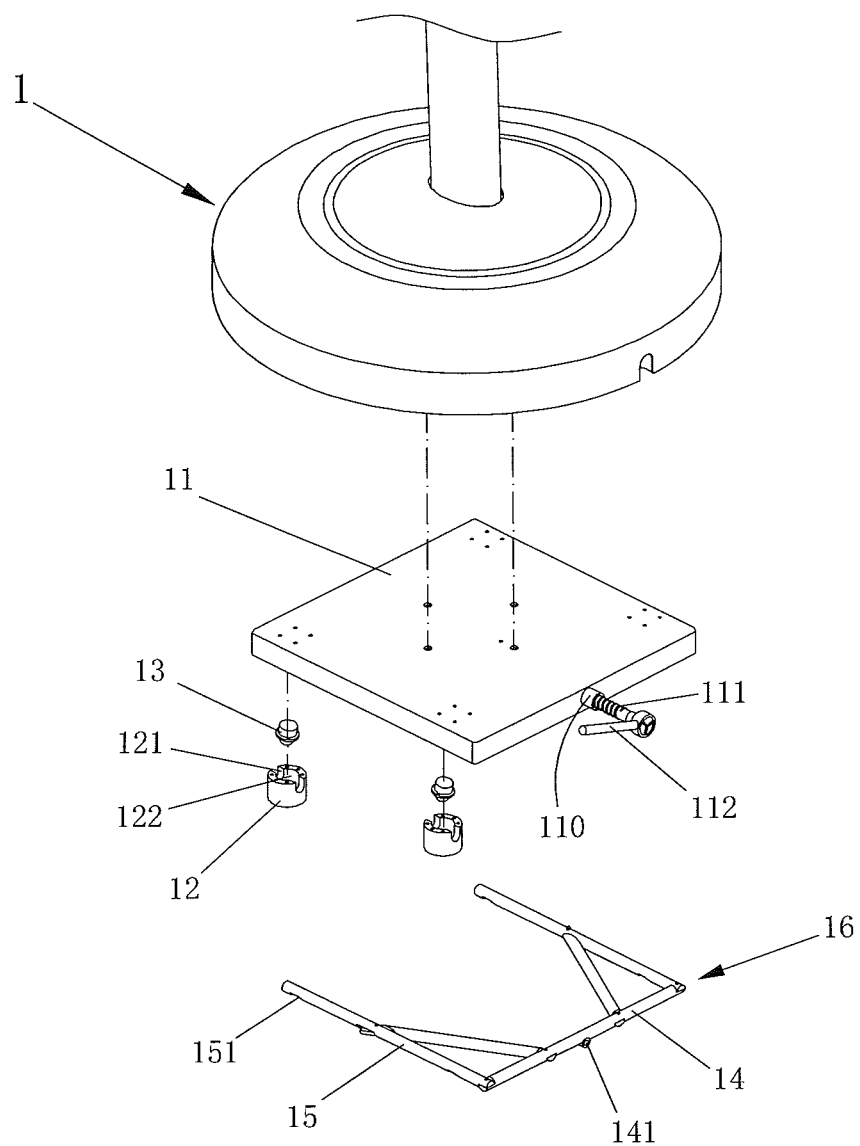
FIG. 2 is a partially exploded perspective view of the lifting device for an umbrella as shown in FIG. 1.
Figure 3:
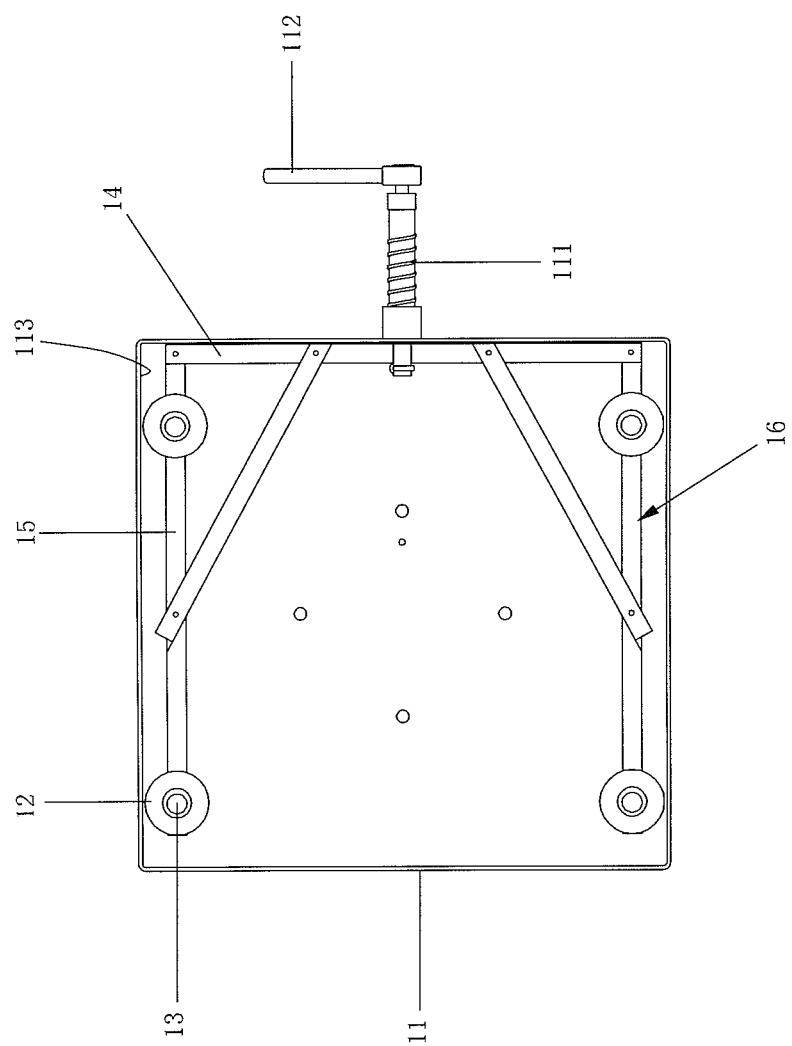
FIG. 3 is a bottom assembly view of the lifting device for an umbrella as shown in FIG. 2.
Figure 4:
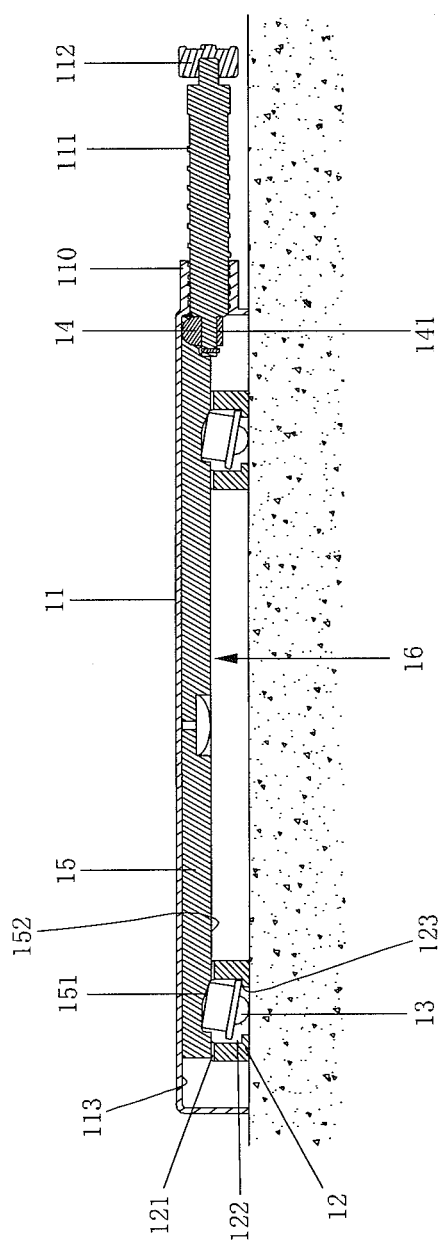
FIG. 4 is a front cross-sectional assembly view of the lifting device for an umbrella as shown in FIG. 2.
Figure 5:
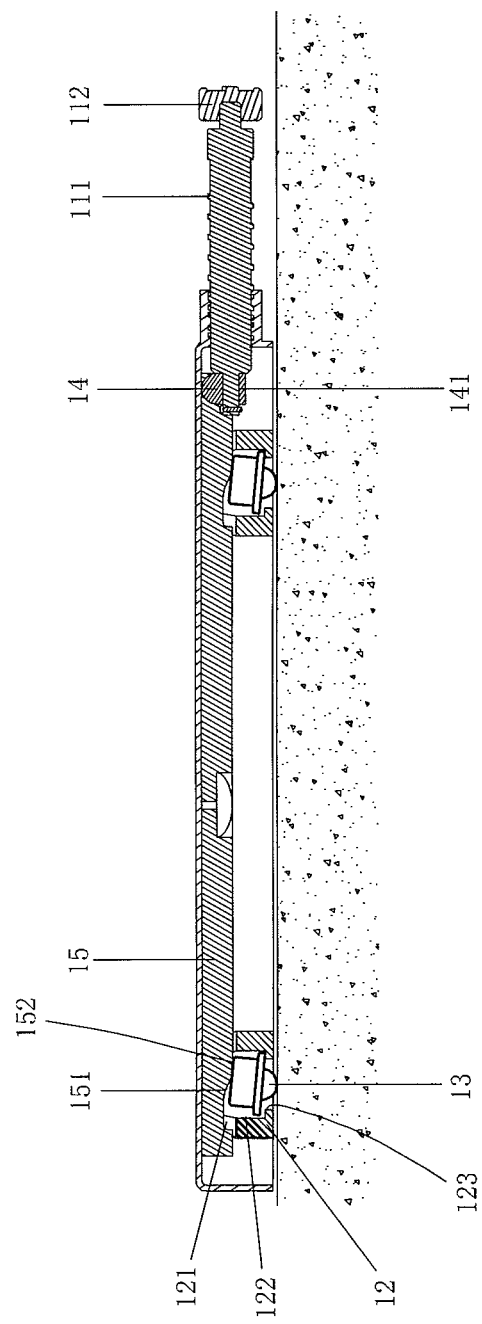
FIG. 5 is a schematic operational view of the lifting device for an umbrella as shown in FIG. 4.
Figure 6:
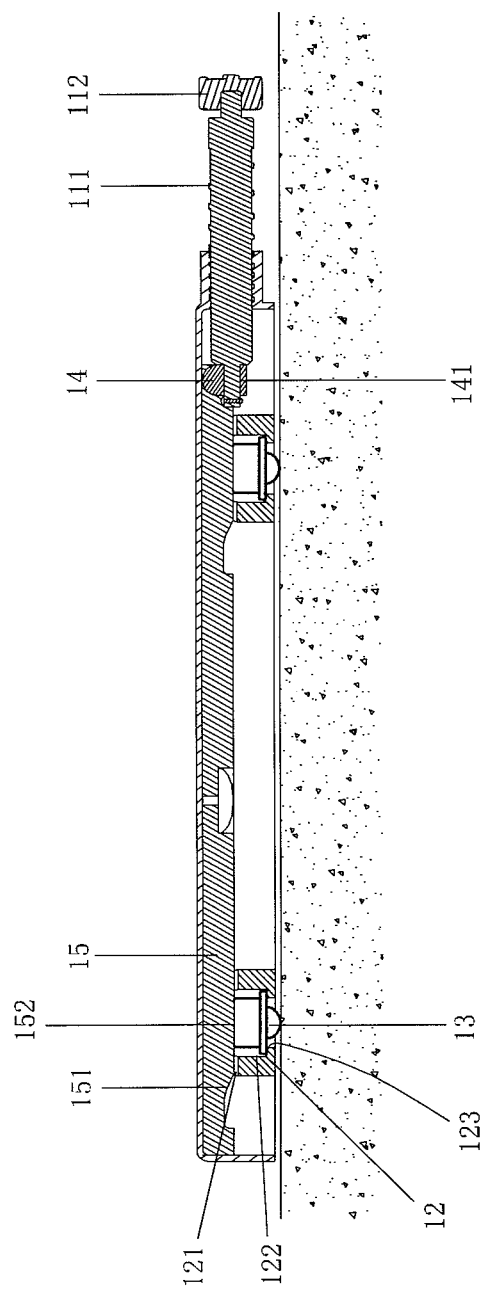
FIG. 6 is a schematic operational view of the lifting device for an umbrella as shown in FIG. 5.

In operation, referring to FIGS. 4-6 with reference to FIGS. 1-3, when the release portion 151 of each of the pressing rods 15 aligns with and receives the respective movable member 13, the respective movable member 13 is fully retracted into the receiving chamber 122 of the respective fixing seat 12 as shown in FIG. 4. Thus, each of the fixing seats 12 is placed on the ground to support the base 11 so that the lifting device 1 is directly placed on the ground. When the threaded rod 111 is rotated by the drive handle 112, the threaded rod 111 is moved relative to the base 11 to push the driven rod 14 of the pressing module 16, so that the pressing rods 15 of the pressing module 16 are moved relative to the movable members 13 and the fixing seats 12. In such a manner, the pressing portions 152 of the pressing rods 15 are moved to press the movable members 13 as shown in FIGS. 5 and 6, so that each of the movable members 13 is lowered down and partially protruded outward from the receiving chamber 122 of the respective fixing seat 12 as shown in FIG. 6. Thus, when the movable members 13 are pressed by the pressing module 16 to protrude outward from the fixing seats 12, the movable members 13 are lowered down to touch the ground and is subjected to a reaction force from the ground, and the fixing seats 12 are lifted to space from the ground, so that the lifting device 1 is lifted and can be displaced by movement of the movable members 13. After the lifting device 1 is moved to a determined position, the threaded rod 111 is rotated reversely by the drive handle 112 to pull the pressing module 16, so that the release portions 151 of the pressing rods 15 are moved to align with and receive the movable members 13, and the movable members 13 are fully retracted into the fixing seats 12 as shown in FIG. 4.

Accordingly, each of the movable members 13 is rotatable freely through an angle of about 360° so that the lifting device 1 is moved on the ground in multiple directions and multiple angles, thereby facilitating the user manipulating and moving the lifting device 1. In addition, the user only needs to rotate the drive handle 112 to lower down the movable members 13 and to lift the lifting device 1 so as to move the lifting device 1 by movement of the movable members 13 so that the lifting device 1 is operated easily and conveniently, thereby facilitating the user operating the lifting device 1. Further, the lifting device 1 has a simplified construction to decrease the cost of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A lifting device for an umbrella comprising:
a base;
a plurality of fixing seats secured on the base;
a plurality of movable members each movably mounted in a respective one of the plurality of fixing seats;
a pressing module movably mounted on the base and pressing the plurality of movable members;
a threaded rod mounted on the base and connected with the pressing module; and
a drive handle connected with the threaded rod, wherein:
each of the plurality of fixing seats is provided with a receiving chamber and a guide slot;
the pressing module includes:
a driven rod; and
two pressing rods connected with two opposite ends of the driven rod;
the driven rod of the pressing module is provided with a through hole connected with the threaded rod;
each of the two pressing rods of the pressing module is extended through and movable in the guide slot of each of the plurality of fixing seats;
each of the two pressing rods of the pressing module is provided with a straight pressing portion and at least one recessed release portion;
the pressing portion of each of the two pressing rods is movable to press a respective one of the plurality of movable members;
the release portion of each of the two pressing rods is movable to align with and receive a respective one of the plurality of movable members; and
each of the plurality of movable members is movable in the receiving chamber of the respective fixing seat;
the base is provided with a threaded tube which is located at a side of the base; and
the threaded rod is screwed into the threaded tube of the base.

2. The lifting device for an umbrella of claim 1, wherein:
the base is provided with a receiving space to receive the pressing module; and
the pressing module is movable in the receiving space of the base.

3. The lifting device for an umbrella of claim 1, wherein the receiving chamber of each of the plurality of fixing seats extends through a whole length of each of the plurality of fixing seats.

4. The lifting device for an umbrella of claim 1, wherein:
the receiving chamber of each of the plurality of fixing seats has a stepped shape and is provided with a protruding stop portion; and
each of the plurality of movable members is stopped by the stop portion of the respective fixing seat.

5. The lifting device for an umbrella of claim 1, wherein the pressing module is located between the base and the plurality of movable members.

6. A lifting device for an umbrella comprising:
a base;
a plurality of fixing seats secured on the base;
a plurality of movable members each movably mounted in a respective one of the plurality of fixing seats;

a pressing module movably mounted on the base and pressing the plurality of movable members;
a threaded rod mounted on the base and connected with the pressing module; and
a drive handle connected with the threaded rod, wherein:
each of the plurality of fixing seats is provided with a receiving chamber and a guide slot;
the pressing module includes:
   a driven rod; and
   two pressing rods connected with two opposite ends of the driven rod;
the driven rod of the pressing module is provided with a through hole connected with the threaded rod;
each of the two pressing rods of the pressing module is extended through and movable in the guide slot of each of the plurality of fixing seats;
each of the two pressing rods of the pressing module is provided with a straight pressing portion and at least one recessed release portion;
the pressing portion of each of the two pressing rods is movable to press a respective one of the plurality of movable members;
the release portion of each of the two pressing rods is movable to align with and receive a respective one of the plurality of movable members; and
each of the plurality of movable members is movable in the receiving chamber of the respective fixing seat; and
each of the plurality of movable members is located between the respective fixing seat and the respective pressing rod of the pressing module.

7. The lifting device for an umbrella of claim 6, wherein:
the threaded rod has a first end abutting the driven rod of the pressing module to move the driven rod of the pressing module and a second end connected with the drive handle; and
the first end of the threaded rod is connected with and rotatable in the through hole of the driven rod.

8. The lifting device for an umbrella of claim 6, wherein the guide slot of each of the plurality of fixing seats is connected to the receiving chamber.

9. The lifting device for an umbrella of claim 6, wherein the pressing module has a substantially U-shaped profile.

10. The lifting device for an umbrella of claim 6, wherein the through hole is located at a mediate portion of the driven rod.

11. The lifting device for an umbrella of claim 6, wherein the threaded rod is rotatably and movably mounted on the base.

12. The lifting device for an umbrella of claim 6, wherein each of the plurality of movable members is a castor.

13. A lifting device for an umbrella comprising:
a base;
a plurality of fixing seats secured on the base;
a plurality of movable members each movably mounted in a respective one of the plurality of fixing seats;
a pressing module movably mounted on the base and pressing the plurality of movable members;
a threaded rod mounted on the base and connected with the pressing module; and
a drive handle connected with the threaded rod, wherein:
each of the plurality of fixing seats is provided with a receiving chamber and a guide slot;
the pressing module includes:
   a driven rod; and
   two pressing rods connected with two opposite ends of the driven rod;
the driven rod of the pressing module is provided with a through hole connected with the threaded rod;
each of the two pressing rods of the pressing module is extended through and movable in the guide slot of each of the plurality of fixing seats;
each of the two pressing rods of the pressing module is provided with a straight pressing portion and at least one recessed release portion;
the pressing portion of each of the two pressing rods is movable to press a respective one of the plurality of movable members;
the release portion of each of the two pressing rods is movable to align with and receive a respective one of the plurality of movable members; and
each of the plurality of movable members is movable in the receiving chamber of the respective fixing seat; and
each of the two pressing rods of the pressing module is movable between:
   a first position where the release portion of each of the two pressing rods aligns with and receives the respective movable member, with the respective movable member being fully retracted into the receiving chamber of the respective fixing seat; and
   a second position where the pressing portion of each of the two pressing rods presses the respective movable member, with the respective movable member being partially protruded outward from the receiving chamber of the respective fixing seat.

14. The lifting device for an umbrella of claim 13, wherein when the threaded rod is rotatable in the threaded tube of the base, the threaded rod is movable forward and backward relative to the base to move the driven rod of the pressing module, and the two pressing rods of the pressing module are movable relative to the plurality of movable members and the plurality of fixing seats.

* * * * *